(12) United States Patent
Thunhorst et al.

(10) Patent No.: US 6,353,037 B1
(45) Date of Patent: Mar. 5, 2002

(54) FOAMS CONTAINING FUNCTIONALIZED METAL OXIDE NANOPARTICLES AND METHODS OF MAKING SAME

(75) Inventors: Kristin LaVelle Thunhorst, Stillwater; Douglas Alan Hanggi, Woodbury, both of MN (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 09/614,574

(22) Filed: Jul. 12, 2000

(51) Int. Cl.⁷ ............................. C08J 9/28; C08F 2/46
(52) U.S. Cl. ..................... 521/64; 521/521; 521/153; 522/81; 522/83; 522/84
(58) Field of Search ................... 521/64, 15.3; 522/81, 522/83, 84

(56) References Cited

U.S. PATENT DOCUMENTS

| | | | |
|---|---|---|---|
| 3,255,127 A | 6/1966 | Bosin | 260/2.5 |
| 3,256,219 A | 6/1966 | Will | 260/2.5 |
| 3,565,247 A | 2/1971 | Brochman | 206/59 |
| RE27,444 E | 7/1972 | Will | 260/2.5 |
| 3,734,867 A | 5/1973 | Will | 260/2.5 |
| 3,953,487 A | 4/1976 | Kratel et al. | 260/448.2 |
| 3,988,508 A | 10/1976 | Liasant | 526/344 |
| 4,367,293 A | 1/1983 | Shimizu | 521/122 |
| 4,415,615 A | 11/1983 | Esmay et al. | 428/40 |
| 4,522,953 A | 6/1985 | Barby et al. | 521/64 |
| 4,522,958 A | 6/1985 | Das et al. | |
| 4,710,536 A | 12/1987 | Klingen et al. | 524/493 |
| 4,715,986 A | 12/1987 | Grüning et al. | 252/315.2 |
| 4,844,980 A | 7/1989 | Grüning et al. | 428/405 |
| 4,954,327 A | 9/1990 | Blount | 423/332 |
| 5,037,579 A | * 8/1991 | Matchett | 501/12 |
| 5,037,859 A | 8/1991 | Williams, Jr. et al. | 521/55 |
| 5,149,720 A | 9/1992 | DesMarais et al. | 521/63 |
| 5,198,472 A | 3/1993 | DesMarais et al. | 521/63 |
| 5,260,345 A | 11/1993 | DesMarais et al. | 521/148 |
| 5,290,820 A | 3/1994 | Brownscombe et al. | 521/64 |
| 5,352,711 A | * 10/1994 | Des Marais | 521/64 |
| 5,360,829 A | 11/1994 | Kawabe et al. | 521/81 |
| 5,387,207 A | 2/1995 | Dyer et al. | 604/369 |
| 5,545,676 A | * 8/1996 | Palazzotto et al. | 522/15 |
| 5,563,179 A | 10/1996 | Stone et al. | 521/64 |
| 5,646,193 A | 7/1997 | Fairchild et al. | 521/63 |
| 5,648,407 A | 7/1997 | Goetz et al. | 523/213 |
| 5,691,846 A | 11/1997 | Benson, Jr. et al. | 359/530 |
| 5,777,001 A | 7/1998 | Seeney et al. | |
| 5,856,366 A | 1/1999 | Shiveley et al. | 521/63 |
| 5,977,194 A | 11/1999 | Mork et al. | |
| 6,015,609 A | 1/2000 | Chaouk et al. | 428/308.4 |
| 6,090,439 A | 7/2000 | Menon et al. | 427/215 |

FOREIGN PATENT DOCUMENTS

| | | |
|---|---|---|
| CA | 1 195 791 A1 | 10/1985 |
| DE | 1 544 690 | 12/1964 |
| DE | 44 19 671 A1 | 12/1995 |
| DE | 196 10 330 A1 | 9/1997 |
| EP | 0 000 933 B1 | 8/1978 |
| EP | 0 068 830 A1 | 1/1983 |
| EP | 0 216 622 A | 4/1987 |
| EP | 0 430 517 A | 6/1991 |
| GB | 1 428 125 | 3/1976 |
| GB | 1 458 203 | 12/1976 |
| GB | 1 493 356 | 11/1977 |
| JP | 51-111279 | 10/1976 |
| JP | 51-111280 | 10/1976 |
| JP | 57-063334 A2 | 4/1982 |
| JP | 58-087134 A2 | 5/1983 |
| JP | 63-113035 | 5/1988 |
| JP | 03-267172 | 11/1991 |
| JP | 03-275177 | 12/1991 |
| JP | 04148978 | 5/1992 |
| JP | 07 165975 | 6/1995 |
| JP | 07 335053 | 12/1995 |
| JP | 10-139945 | 11/1996 |
| WO | WO 96/21680 | 7/1996 |
| WO | WO 96/21682 | 7/1996 |

(List continued on next page.)

OTHER PUBLICATIONS

Bougeat–Lami, E. et al.; "Poly(Ethyl Acrylate) Latexes Encapsulating Nanoparticles of Silica: 1 Functionalization And Dispersion of Silica", *Polymer, GB, Elsevier Science Publishers B.V.*, vol. 36, No. 23, Nov. 1, 1995.

U.S. application No. 09/398,355, Thunhorst et al., filed Sep. 17, 1999.

U.S. application No. 09/428,937, Zhang et al., filed Oct. 28, 1999.

U.S. application No. 09/429,185, Zhang et al., filed Oct. 28, 1999.

U.S. application No. 99/25276, filed Oct. 28, 1999.

Article: Garrett et al., "An Experimental Study of the Antifoam Behaviour of Mixtures of a Hydrocarbon Oil and Hydrophobic Particles," *Colloids and Surfaces A: Physicochemical and Engineering Aspects*, vol. 85, 1994, pp. 159–197.

Article: Williams, et al., "Spatial Distribution of the Phases in the Water–in–Oil Emulsions. Open and Closed Microcellular Foams from Cross–Linked Polystyrene," *Langmuir*, American Chemical Society, vol. 4, No. 3, 1988, PP. 656–662.

Article: Williams, et al., "High Internal Phase Water–in–Oil Emulsions: Influence of Surfactants and Cosurfactants on Emulsion Stability and Foam Quality", *Langmuir*, American Chemical Society, vol. 4, No. 3, 1991, pp. 1370–1377.

(List continued on next page.)

*Primary Examiner*—Morton Foelak
(74) *Attorney, Agent, or Firm*—Melanie Gover

(57) ABSTRACT

The invention discloses methods for making foams comprising functionalized metal oxide nanoparticles by photopolymerizing or thermally polymerizing emulsions comprising a reactive phase and a phase immiscible with the reactive phase components. Foams made from water-in-oil emulsions, including high internal phase emulsion are also disclosed. Articles and uses for the foams are also described.

15 Claims, 4 Drawing Sheets

FOREIGN PATENT DOCUMENTS

| WO | WO 96/40528 | 12/1996 |
|----|-------------|---------|
| WO | WO 97/31600 | 9/1997 |
| WO | WO 97/32612 | 9/1997 |
| WO | WO 98/05484 | 2/1998 |
| WO | WO 98 51713 A | 11/1998 |
| WO | WO 99/09070 | 2/1999 |
| WO | 99/25276 | 10/1999 |

OTHER PUBLICATIONS

Article: Hoisington et al., "High Temperature, Polymeric, Structural Foams from High Internal Phase Emulsion Polymerizations," *Polymer*, vol. 38, No. 13, 1997, pp. 3347–3357.

Article: Apen et al., "Bromine–Containing Polymeric Foams," *Journal of Cellular Plastics*, vol. 28, November 1992, pp. 557–570.

Product Literature: "Cab–O–Sil ® Untreated Fumed Silica Properties and Functions," four pages.

Article: Pugh, "Foaming, Foam Films, Antifoaming and Defoaming", *Advances in Colloid and Interface Science*, vol. 64, 1996, pp. 67–142.

Article: Wang et al., "On the Role of Hydrophobic Particles and Surfactants in Defoaming," *Langmuir*, vol. 15, No. 6, 1999, pp. 2202–2208.

* cited by examiner

FOAMS CONTAINING FUNCTIONALIZED METAL OXIDE NANOPARTICLES AND METHODS OF MAKING SAME

TECHNICAL FIELD

This invention relates to foams made by polymerizing emulsions containing functionalized metal oxide nanoparticles by both thermal and photopolymerization methods. The emulsions comprise a reactive phase and an immiscible phase wherein the reactive phase or both phases are continuous. The resulting foams may be closed or open cell, depending on the initial emulsion microstructure.

SUMMARY OF INVENTION

The present invention features a novel method for creating foams from water-in-oil emulsions containing functionalized metal oxide nanoparticles. The foams may be made from high internal phase emulsions (HIPEs) and other water-in-oil emulsions using one or both of a photopolymerization process or a thermal polymerization process. The foams may be made by a batch process, or a continuous process in which the emulsion may be coated on a moving support. In either case, the foam is polymerized and crosslinked by exposure to actinic radiation, by heating, or using both actinic radiation and heating. The actinic radiation polymerization process is fast, which can allow a broad range of materials to be used because the emulsion needs to be stable for only a short time (seconds to minutes). One aspect of the present invention provides a process for making a crosslinked polymeric foam comprising: a) mixing a reactive phase comprising at least one polymerizable material and at least one functionalized metal oxide nanoparticle material (for example silica nanoparticles functionalized with polymerizable groups) with at least one initiator and a fluid immiscible with the reactive phase to form an emulsion wherein the immiscible fluid forms a discontinuous or co-continuous phase with the continuous reactive phase; b) shaping the emulsion; and c) exposing the emulsion to actinic radiation or thermal energy to form a crosslinked polymeric foam containing residual immiscible fluid.

If desired, the functionalized metal oxide nanoparticle material can function as an emulsifier and/or crosslinking agent. Optionally, a separate emulsifier and crosslinking agent, in addition to the functionalized metal oxide nanoparticle material, may be added to the reactive phase.

The process may include exposing the emulsion to both actinic radiation and thermal energy, simultaneously or sequentially.

The polymerizable material may be the same as the crosslinking agent or the emulsifier.

The immiscible phase is typically water, but may comprise other fluids such as fluorocarbons or organic liquids. The immiscible fluid may comprise 74 volume percent, or more, of the emulsion.

The reactive phase may include, e.g., non-polymerizable materials and materials that can incorporate functional groups into the foam.

The structure of the foam of the present invention may be controlled by aging the emulsion prior to polymerization or by selection of a particular agitation method for making the emulsion.

The emulsion may include photoinitiators in the reactive or immiscible phase. Preferably, the photoinitiators are activated by ultraviolet or visible radiation of 300 to 800 nanometers. The emulsion may include thermal initiators in addition to, or instead of, photoinitiators. The thermal initiators can be present in either the reactive phase or the immiscible phase.

Polymerization and crosslinking of the emulsion may occur in as little as 10 minutes or even 10 seconds particularly when photopolymerization is used.

A further aspect of the invention is an emulsion having a continuous reactive phase comprising at least one polymerizable material and at least one type of functionalized metal oxide nanoparticle, a discontinuous or co-continuous phase comprising a fluid immiscible with the reactive phase, and either a photoinitiator or a thermal initiator.

Foams of the present invention may be open or closed cell. Foams of the present invention made from HIPEs have relatively homogeneous cells. The cells of the open cell foams of the present invention may be joined by open "windows" or holes connecting adjacent cells. All of the foams of the present invention contain functionalized metal oxide nanoparticles. Another aspect of the invention is a cross-linked foam comprising residue of a photoinitiator that absorbs at a wavelength of 300 to 800 nanometers. A further aspect of the invention is a crosslinked foam comprising residue of a thermal initiator. Further, foams can contain residue of both a thermal initiator and a photoinitiator.

The foams may be crosslinked within the voids of a material selected from the group consisting of polymeric, woven, nonwoven, and metals. Alternatively, the foam may contain non-polymerizable materials selected from the group consisting of polymers, metals, particles, and fibers.

Some of the foams may be able to collapse when fluid is removed.

Another aspect of the present invention is articles made using the foams of the present invention.

As used in this invention:

"HIPE" or "high internal phase emulsion" means an emulsion comprising a continuous reactive phase, typically an oil phase, and a discontinuous or co-continuous phase immiscible with the oil phase, typically a water phase, wherein the immiscible phase comprises at least 74 volume percent of the emulsion;

"water-in-oil emulsion" means an emulsion containing a continuous oil phase and a discontinuous water phase; the oil and water phases may be co-continuous in some cases;

"reactive phase" or "oil phase" means the continuous phase which contains the monomer or organic reactive species that are sensitive to reactive propagating species (e.g., those having free radical or cationic centers) and can be polymerized or crosslinked;

"immiscible phase" means a phase in which the reactive components have limited solubility; the immiscible phase may be discontinuous, or co-continuous with the reactive phase components;

"stable" means the composition and microstructure of the emulsion are not changing over time;

"functional group" means a chemical entity capable of undergoing a non-polymerization reaction;

"functionalized metal oxide nanoparticle" means a nanoparticle prepared from colloidal materials from the group of silica, zinc oxide, titania, alumina, zirconia, vanadia, chromia, iron oxide, antimony oxide, tin oxide, other colloidal metal oxides, and mixtures thereof, functionalized such that (a) the nanoparticles dissolve in the reactive and/or immiscible phase and (b) chemical entities attached to the nanoparticle are capable of polymerization; these particles can comprise essentially a single oxide such as silica or can comprise a core of an oxide of one type (or a core of a material) on which is deposited the oxide of another type;

"monomer" means chemical species capable of polymerizing, it includes monomers and oligomers;

"reactive surfactant" means a surfactant (i.e., emulsifier) having sufficient reactivity to undergo polymerization reactions such that it becomes part of a polymer backbone;

"open cell" means a foam wherein the majority of adjoining cells are in open communication with each other; an open cell foam includes foams made from co-continuous emulsions in which the cell structure is not clearly defined, but there are interconnected channels creating at least one open pathway through the foam;

"window" means an intercellular opening;

"shaping" means forming into a shape and includes pouring, coating, and dispensing;

"polymerize" or "cure" are used interchangeably in this application and indicate a chemical reaction in which monomers, oligomers, polymers, or functionalized metal oxide nanoparticles combine, including by crosslinking, to form a chain or network;

"crosslinking" means the formation of chemical links between polymer chains;

"crosslinking agent" means a material that adds to a polymer chain a site capable of forming a link to another polymer chain;

"cationically curable monomer" means a monomer capable of undergoing polymerization in which cationic species propagate the polymerization reaction and includes monomers containing, e.g., epoxide or vinyl ether moieties;

"ethylenically unsaturated" means a monomer having a carbon—carbon double bond in its molecular structure;

"actinic radiation" means photochemically active radiation including near infrared radiation, visible light, and ultraviolet light;

"UV" or "ultraviolet" means actinic radiation having a spectral output between about 200 and about 400 nanometers;

"visible light" means actinic radiation having a spectral output between about 400 to about 800 nanometers;

"near infrared" means actinic radiation having a spectral output between about 800 to about 1200 nanometers;

"photoinitiator" means a chemical added to selectively absorb actinic radiation and generate reactive centers such as free radicals and cationic species;

"thermal initiator" means a species only capable of efficiently inducing or causing polymerization or crosslinking upon exposure to heat;

"pressure sensitive adhesive" or "PSA" means an adhesive that will adhere to a variety of dissimilar surfaces upon mere contact without the need of more than finger or hand pressure; PSAs are sufficiently cohesive and elastic in nature so that, despite their aggressive tackiness, they can be handled with the fingers and removed from smooth surfaces with little or no residue left behind; PSAs can be quantitatively described using the "Dahlquist criteria" which maintains that the elastic modulus of these materials is less than $10^6$ dynes/cm$^2$ at room temperature. See Pocius, A. V., Adhesion & Adhesives: An Introduction, Hanser Publishers, New York, N.Y., First Edition, 1997, and "void" means any open space, in a foam, such as holes, cells, and interstices.

An advantage of at least one embodiment of the present invention is that the resulting foams and articles made with the present invention contain functionalized metal oxide nanoparticles, which might have desirable activity.

An advantage of at least one embodiment of the present invention is that a broad spectrum of foam physical properties can be generated by manipulating the type of monomers and co-monomers, the monomer to co-monomer ratio, cell size, percentage of open cells, density of the foam, and mixing methods.

An advantage of at least one embodiment of the present invention is that the foams may be hydrophilic when produced, depending on monomer and surfactant choice. This eliminates having to incorporate hydrophilizing agents or treat the foam surfaces to make them hydrophilic (e.g. when used as an absorbent) as is required with some styrenic-based thermally polymerized foams.

An advantage of at least one embodiment of the present invention is that the foam materials are suitable for a myriad of applications such as energy and fluid absorption, insulation, and filtration. An advantage of at least one embodiment of the present invention is that multilayer articles comprising one or more foam layers may be made.

An advantage of at least one embodiment of the present invention is that the foams made by the current invention may contain no added surfactant because the functionalized metal oxide nanoparticles have some emulsifying capability. The functionalized metal oxide nanoparticles can act as a reactive surfactant. In this case, no additional surfactant is necessary in the emulsion. This aspect of the invention is further advantageous because the functionalized metal oxide nanoparticles become polymerized into the final foam structure and will have a reduced tendency to leach when the foam is used.

Other features and advantages of the invention will be apparent from the following drawings, detailed description, and claims.

DETAILED DESCRIPTION

Figure 1A:
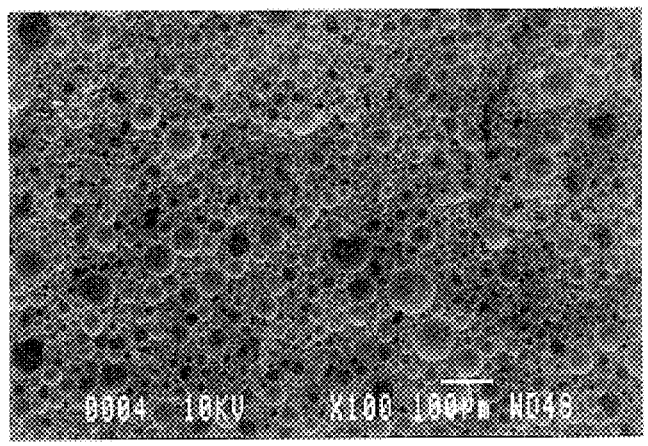
FIGS. 1a–1c show SEM digital image micrographs of cross sections of a photopolymerized isooctyl acrylate foam containing functionalized silica nanoparticles. The density of this foam is higher than the foam shown in FIGS. 2a–2c. The composition of the emulsion used to prepare this foam (sample 1B) is the same as for sample 1 in Table 1 except about 0.05 ml of NH$_4$OH was added to the emulsion in the making of sample 1B. Magnification of the foam increases from top to bottom, with the magnifications being 100×, 500×, 1000×, respectively.

Polymeric foams of the present invention may be made by polymerizing HIPEs (emulsions having relatively high immiscible-to-reactive phase volume ratios of approximately 3:1 to 15:1 or greater) and other emulsions. Processes using one or both of thermal energy and actinic radiation can be used. Although water is typically used as the immiscible phase, any fluid that is a liquid at operating conditions and is substantially immiscible with the reactive phase components could be used. Having a non-aqueous immiscible phase allows the use of water-soluble (not merely hydrophilic), ethylenically unsaturated reactants in the reactive phase. Additionally, a nonaqueous immiscible phase can enable the use of water-sensitive polymerization methods, such as cationic polymerization.

For cationic polymerizations, it is often useful to illuminate the emulsion with UV or visible light (starting the photopolymerization by activating a catalyst) and follow this activation step with some heating. The propagating species in cationic polymerizations are much longer-lived than those in free radical polymerizations, and can continue to propagate without illumination (i.e., during the heating step). The reactive species in free radical polymerizations are typically much shorter lived and do not propagate significantly once the light source is removed. The benefit of conducting a post heating step on foams made from cationically polymerizing materials is that the reactivity of the materials (e.g. epoxies) is supplemented by heating. Additionally, higher temperatures will provide greater diffusion in a polymerizing system, leading to increased levels of monomer conversion. Enhancements in physical properties may be produced by post-heating cationically polymerizing systems that were first activated through photopolymerization. These effects can also be produced by maintaining elevated temperatures during a photopolymerization process, instead of conducting a separate post-heating step after the photopolymerization. In fact, free radical polymerizations can also be driven to higher levels of conversion if they are maintained at elevated temperatures during the photopolymerization step.

Emulsions having co-continuous reactive and immiscible phases may also be used to make foams of the present invention, e.g., a water-in-oil emulsion with a water to oil ratio of less than 3:1.

The emulsions of the present invention may contain a photoinitiating specie(s). The photoinitiating specie(s) may be present in either phase. The emulsions may additionally, or alternatively, include a thermal initiating species. The thermal initiator may be present in either the reactive or immiscible phase.

After the emulsions are formed, they may be polymerized and crosslinked by exposure to actinic radiation, e.g., ultraviolet and visible radiation, or exposure to thermal energy. In some cases, removal of the immiscible phase can leave an open cell foam structure. Closed cell foams may also be made according to the present invention.

The relative amounts of immiscible and reactive phase components used to form the emulsions of the present invention, among many other parameters, can be important in determining the structural, mechanical, and performance properties of the resulting polymeric foams. The immiscible phase to reactive phase volume ratio can influence foam characteristics such as density, cell size, cell structure, and dimensions of struts that form the foam structure. The density and microstructure of the foam also depend on aspects of the emulsion-making process (rate of immiscible phase addition to the reactive phase, agitation method, polymerization conditions etc.).

Some of the emulsions of the present invention can be photopolymerized rapidly. They may be polymerized in less than one hour, less than 10 minutes, less than 30 seconds, less than 10 seconds, or less than 1 second. This rapid polymerization allows a wide variety of compositions to be used. Because polymerization can occur quickly with the photopolymerization method of the present invention, an emulsion need only be stable for a short period of time, e.g., up to several minutes. The emulsions of the present invention can also be thermally polymerized, which is typically not as rapid a process as the photopolymerization described herein. Thermal polymerization can occur within minutes of heating, or it can take as long as several hours. This longer polymerization time can allow differing foam structures to be obtained by allowing the emulsion structure to decompose to some extent before polymerization. Emulsions can be both photopolymerized and thermally polymerized either simultaneously or sequentially.

The emulsions may also be applied onto or into materials before polymerization so that the reactive phase of the emulsion polymerizes in and around the material, thus incorporating the material into the foam structure. The incorporated materials can provide the foam with strength and other desirable properties. Suitable materials include porous or open-weave materials such as woven, nonwoven, fibrous, and particulate materials, including scrims. The foams may also be coated, and polymerized, on nonporous materials such as paper, polymer, metal materials, and microstructured substrates.

Light in the visible and/or ultra-violet range (200 to about 800 nm) is preferably used when the emulsions of the present invention are photopolymerized. Due to the tendency of emulsions to scatter light, it is preferable to use long wavelengths in this range because they are better able to penetrate the emulsions. The photoinitiators used should be able to absorb at least some of the wavelength(s) of the light source used. The photopolymerization process of the present invention allows the production of emulsions and foams without thermal initiators or thermal initiator residue. However, for some emulsions, it may be desirable to conduct thermal polymerization or a combination of photo and thermal polymerizations. Thermal polymerization is convenient for emulsions containing particles, polymers, metals, scrims, pigments, dyes and other components, which could interfere with the photopolymerization reaction or light absorption. Extremely thick sections of foam can be more easily polymerized thermally.

After the foam has been polymerized, the immiscible phase fluid will typically still be present in the foam. This residual immiscible fluid may be removed by drying the foam structure. Suitable drying methods include, e.g., vacuum drying, freeze drying, squeeze drying, microwave drying, drying in a thermal oven, drying with infrared lights, or a combination of these techniques.

The emulsions are typically prepared under low shear conditions, i.e., methods providing gentle mixing of the continuous and dispersed phases, such as shaking, using an impeller mixer or pin mixer, and using a magnetic stir bar. High shear conditions may be achieved with, e.g., a rotor stator mixer. Properties of foams of the present invention such as cell sizes, cell size distributions, and number of windows may be influenced by the agitation methods or agitation speeds used to make the emulsions. Cell sizes will also depend on factors such as the type of monomer(s) and surfactant(s) used, the type of functionalized metal oxide nanoparticles included, and the volume ratio of immiscible phase to reactive phase.

Emulsions of the present invention may be made by continuous or batch processes. Suitable apparatus for making the emulsions continuously include static mixers, rotor stator mixers, and pin mixers. Greater agitation may be achieved by increasing the speed of agitation or using apparatus designed to disperse the emulsifier more finely in the emulsion during the mixing process. Batch process emulsions may be made by mixing or shaking the combined ingredients, by hand or by machine. Greater agitation in a batch process may be achieved, by using e.g., a driven impeller mixer or a three-propeller mixing blade.

The foam microstructure can also be influenced by the amount of time elapsed between preparation of the emulsion and polymerization. Typically, as more time elapses, the emulsion begins to break down, i.e., cells coalesce and/or cell walls collapse. A foam made from an aged emulsion may have larger and fewer cells than a foam made from the same emulsion but polymerized soon after the emulsion is made. Aging the emulsion can also affect the size, number, and location of the interconnecting windows, which can alter the fluid uptake behavior of the resulting foam.

Adding a salt to the immiscible phase can change the cell and window structures because it forces the lipophilic monomer out of the immiscible phase and into the reactive phase thereby improving emulsion stability. i.e., the emulsion resists breaking down into distinct layers of reactive and immiscible phases. Salts are not needed in the present invention, but may be used. Salts are typically preferred in thermally polymerized emulsions due to the longer required polymerization times.

As mentioned above, a variety of mixing techniques can be used to make the emulsions of the present invention. For a given reactive-to-immiscible phase ratio, each of these mixing techniques has the potential to produce a slightly different emulsion microstructure. The various microstructures will provide different properties in terms of pressure drop, fluid flow, tortuosity of the fluid path, surface area, etc. The ability to make many different microstructures with the same starting materials makes this process of the current invention a particularly versatile one.

Some polymeric foams of the present invention made from HIPEs may be relatively open-celled. This means that most or all of the cells are in unobstructed communication with adjoining cells although closed cell foams may also be made. The cells in such substantially open-celled foam structures have intercellular windows that are typically large enough to permit fluid transfer from one cell to another within the foam structure.

The substantially open-celled foam structures possess individual cells being defined by a plurality of mutually connected, three-dimensionally branched webs. The strands of polymeric material making up these branched webs can be referred to as struts. The struts typically form a dimensionally long-range macroscopic structure, in contrast to a loosely associated network of particles.

Closed cell foams may also be made by the process of the present invention. Whether foam cells are open or closed will largely depend on several aspects including the reactive to immiscible phase ratio, surfactant type and concentration, and nanoparticle type and concentration. This phenomenon, and the appropriate surfactant content needed to obtain a closed-cell foam, are described, for example, in Williams, J. M. and Wrobleski, D. A., *Spatial Distribution of the Phases in Water-in-Oil Emulsions, Open and Closed Microcellular Foams from Cross-Linked Polystyrene*, Langmuir Vol. 4, No. 3, 1988, 656–662.

Because the functionalized metal oxide nanoparticles can have a significantly greater density than the other monomers used in the reactive phase, the foam density is dependent on the amount of metal oxide silica nanoparticle materials and the reactive to immiscible phase ratios. The density ranges stated herein and the weight percent ranges given in the component and phase descriptions assume that the density of the reactive phase is approximately 1 g/cc. Densities of foams that contain functionalized metal oxide nanoparticles can be significantly greater than those listed above. For example, silica nanoparticles can have a density of 2 to 4 g/cc so when the weight fractions are calculated the density of the foam appears higher than that of the polymer matrix, while a significant amount of porosity is maintained. Foam cells, and especially cells formed by polymerizing a monomer-containing reactive phase that surrounds a relatively monomer-free immiscible phase droplet, tend to be substantially spherical in shape. Cell sizes typically range from 1 to 200 $\mu$m and are preferably less than 100 $\mu$m. The HIPE foams may have 0 to more than 100 intercellular windows per foam cell. The windows preferably have diameters of 0.1 to 25 $\mu$m, more preferably 0.1 to 10 $\mu$m. The non-HIPE foams of the present invention typically have an interconnected channel structure. Non-HIPE foams contain less than 74 volume percent immiscible phase in the emulsion. Closed cell foams and foams that have a predominately closed-cell character will either not have interconnections or windows between the foam cells, or may have very few and small interconnections.

Foam materials of the present invention having two major parallel surfaces may be from 0.05 to 10 millimeters thick, preferably 8 mm or less for successful photopolymerization. When photopolymerization is used the emulsions should not be made into a shape or thickness that prevents actinic radiation from penetrating at least halfway through it (so the emulsion can be fully polymerized by exposing each side). The allowable thickness will depend on the materials used, the nature of the polymerizing actinic radiation, the photoinitiator type, and the amount of photoinitiator used. Decreasing the amount of photoinitiator can decrease the light absorption of the emulsion and may increase light penetration, depending on the light scattering effects of the emulsion. If scattering effects dominate, reducing the photoinitiator level will have little effect on light penetration. Foams thicker than 8 to 10 mm could be made by photopolymerizing a sequence of layers, with each new emulsion layer being placed on the previously polymerized layers and being of a thickness that would allow light to penetrate through its entire depth.

If the emulsions are thermally polymerized, or polymerized with a combination of photo and thermal methods, very thick samples, e.g., several inches can be obtained because the thermal energy can penetrate the entire sample.

Articles

The foams may be made into sheets, slabs, and other shapes. The thickness of an article can vary and may depend on process conditions such as the composition, type of polymerization and initiator type and amount.

Layered articles may be made by photopolymerization by layering the emulsion with other polymerizable or non-polymerizable materials so long as the materials used are sufficiently transparent to the wavelength absorbed by the photoinitiator in the emulsion, or so long as the foam comprises an outer layer of a structure such that the emulsion can be fully penetrated by a sufficient amount of the radiation at the wavelength being used. For thermally polymerized articles, light absorption and transparency of layers is not a limiting factor. Multilayer articles may also be made by post-production processes such as laminating. The layered articles may have a myriad of different properties depending on the composition, bulk density, cell sizes, window sizes, etc. of the foams. The layers may differ by more than 20% with respect to, for example, content of a particular component and/or density.

Multi-regional articles may be made by a number of methods. They may be made by adding pieces of polymerized foam to an emulsion that is subsequently cured. They may also be made by carefully mixing two or more emulsions prior to curing. The different regions or areas in the resulting foam article may differ with respect to composition, density, color, or other properties.

The foams of the present invention have many useful properties including, for example, absorbency, sound and thermal insulation, filtering capabilities, buoyancy, and resiliency. By varying the starting material and processing conditions, the foam structure can be tailored to have particular properties suitable for their intended uses.

Some foams of the present invention may collapse upon removal of the immiscible fluid, and can remain in a collapsed state after removal of the immiscible fluid.

Foams comprised of pressure sensitive adhesives can provide adhesive foam articles that do not require the separate application of an adhesive layer. This is beneficial in some applications requiring adherence of the foam to another surface.

When used for aqueous fluid absorption, preferred polymeric foams are sufficiently hydrophilic to permit the foam to absorb aqueous fluids. The level of hydrophilicity can depend on the starting material(s). Foams created from an emulsion having a non-water immiscible phase and monomers that are water soluble would be very hydrophilic and could take up water better than foams made with water insoluble monomers. Hydrophilicity may also be modified by post-production processes known in the art.

The foams of the present invention can be hydrophilic and may provide desirable fluid handling properties such as good wicking and fluid distribution characteristics. These characteristics help vertical wicking, i.e., fluid wicking in a direction primarily normal to a major surface of the foam article. This is a desirable performance attribute for many absorbent foams because any imbibed fluid may be quickly moved away from the impingement zone. Foam articles that provide vertical wicking allow absorbed fluid to be moved from the foam surface to deeper within the absorbent core of the article. These characteristics help transport imbibed fluid away from the initial impingement zone and into the unused balance of the foam structure, which allows subsequent fluid flows to the initial impingement zone to be accomodated. The foams can also have a relatively high storage capacity as well as a relatively high fluid capacity under load, i.e., under compressive load. The foams may be made to be sufficiently flexible and soft to be suitable for use against skin.

The fluid handling properties of a foam can be related to the foam's capillary structure. Foams having larger cell and window sizes tend to acquire fluid quickly but do not distribute fluid sufficiently against the force of gravity, nor do they store fluid effectively. Conversely, foams having smaller cell and window sizes are able to wick fluid against the force of gravity and store the fluid tightly, but are typically slower to acquire fluid.

Foams of the invention having different absorption characteristics may be layered to produce an absorbent article having layers of foams suited for fluid acquisition and distribution alternating with layers of foams that are suited for fluid storage.

Closed cell foams produced according to this invention may not offer the fluid absorption properties described above. The closed cell materials will not offer the wicking properties described for the open cell foams. However, these closed cell materials can provide greater resiliency and buoyancy than their open cell analogues.

In addition, patterned foam articles can be produced by shaping and curing the emulsion while in contact with a microstructured surface. After curing, the foam is separated from the microstructured surface and the foam retains the geometrical pattern of the surface. These conventional techniques are described in U.S. Pat. No. 5,691,846, incorporated by reference. The microstructured surface can be chosen from a wide variety of geometrical shapes that include cavities, channels, posts, or profiles. The pattern can be selected depending on the desired use of the foam.

Some foams of the present invention may be suitable for use as filters. Open-celled foams can allow fluids (including air and liquids) to pass through, while the cells and windows can trap particles. The optimum foam structure of an open-celled foam, including cell sizes and number of windows, will depend on the fluid being filtered and the size of the particles to be removed and whether or not the fluids contain dissolved or soluble species that can interact with the foam.

Emulsion

Reactive Phase

The continuous (reactive) phase of an emulsion of the present invention comprises monomers that form the polymer matrix, or struts, of the foam structure after polymerization. The reactive phase comprises at least one polymerizable material and at least one type of functionalized metal oxide nanoparticles. In addition to the polymerizable material and functionalized metal oxide nanoparticles, the reactive phase can contain an emulsifier and a crosslinking agent. However, the polymerizable material and crosslinking agent may be the same multifunctional material. Additionally, the polymerizable material and the emulsifier may be the same material, as in the case where the emulsifier is a reactive surfactant. Further, the functionalized metal oxide nanoparticles can function as both the emulsifier and crosslinking agent in the reactive phase.

Thus it is particularly desirable that the surface of the inorganic nanoparticles be treated, by reaction or adsorption of appropriate reagents, to minimize self-aggregation and to improve solubility in the desired reactive or immiscible phase. Furthermore, the surface treatment of the nanoparticles of the present invention also serves to incorporate chemical functionality for covalent reaction with reactive phase monomers. This surface modification can be effected by various different methods, which are known in the art. (See, e.g., the surface modification techniques described in U.S. Pat. Nos. 2,801,185 and 4,522,958, which are incorporated herein by reference.)

A reactive surfactant may make a foam more hydrophilic or hydrophobic, depending on its structure, as may the functionalized metal oxide nanoparticles. Both photo and thermal initiators may also be present in the reactive phase.

Selection of particular types and amounts of monomers and optional comonomers, optional emulsifiers, functionalized metal oxide nanoparticles and optional multifunctional crosslinking agents can be important in obtaining a foam having the desired combination of structural, mechanical, and fluid handling properties to render the foam materials suitable for their intended uses. The components of the reactive phase should be substantially insoluble in the immiscible phase. Additives, including materials that do not participate in the polymerization reaction, can also be included in the reactive phase.

Functionalized Metal Oxide Nanoparticles

Silica nanoparticles can be treated with monohydric alcohols, polyols, or mixtures thereof (preferably, a saturated primary alcohol) under conditions such that silanol groups on the surface of the particles chemically bond with hydroxyl groups to produce surface-bonded ester groups. The surface of silica (or other metal oxide) particles can also be treated with organosilanes, e.g, alkyl chlorosilanes, trialkoxy arylsilanes, olefinic silanes, or trialkoxy alkylsilanes, or with other chemical compounds, e.g., organotitanates, which are capable of attaching to the surface of the particles by a chemical bond (covalent or ionic) or by a strong physical bond, and which are chemically compatible with the chosen reactive monomer(s). Metal oxide nanoparticles can also be treated such that pendant cationically polymerizable species are attached to the surface of the nanoparticles. For silica nanoparticles treatment with organosilanes is generally preferred.

The metal oxide nanoparticles of the invention preferably comprise silica particles that have an average diameter of less than about 500 nanometers (nm). More preferably, the primary (individual) silica particles have an average diameter of less than about 300 nm, and most preferably, the average diameter is less than about 100 nm. The silica particles may be aggregated, where the aggregate comprises a plurality of smaller sized silica particles; however, it is still desirable and preferable that the total aggregate size be less than about 300 nm, more preferably less than about 200 nm, most preferably less than about 100 nm. The silica nanoparticles used in the present invention are preferably substantially spherical and substantially non-porous. Although the silica is essentially pure, it may contain small amounts of stabilizing ion such as ammonium and alkaline metal ions.

Preferred functionalized silica nanoparticles for use in the materials of the invention may be prepared from commercial colloidal silica sols available from Nalco Chemical Co. (Naperville, Ill.) under the product designation NALCO COLLOIDAL SILICAS. For example, preferred silicas include NALCO products 1040, 1042, 1050, 1060, 2327 and 2329. Suitable fumed silicas include, for example, products sold under the tradename AEROSIL series OX-50,-130,-150, and -200 available from DeGussa AG, (Hanau, Germany), and CAB-O-SIL M5 available from Cabot Corp. (Tuscola, Ill.).

Surface-treating the nano-sized silica particles before loading into the reactive or immiscible phase can provide solubility in the phase and decrease agglomeration. Furthermore, it is preferred that the silica be modified over at least a portion of its surface with a surface treatment agent which is copolymerizable with the reactive phase monomer (s) so that the stabilized particle can copolymerize or react during photopolymerization.

The silica particles of the present invention are preferably treated with a phase compatibilizing surface treatment agent. Particularly preferred surface treatment or surface modifying agents include silane treatment agents capable of polymerizing with a reactive monomer. Preferred silane treatment agents include γ-methacryloxylpropyltrimethoxysilane, available commercially under the trade designation A-174, available commercially from Witco OSi Specialties (Danbury, Conn.) and γ-glycidoxypropyltrimethoxy silane, available under the trade designation G6720 from United Chemical Technologies (Bristol, Pa.). Alternatively a combination of surface modifying agents can be useful, wherein at least one of the agents has a functional group co-polymerizable with a reactive monomer. For example, the polymerizing group can be ethylenically unsaturated or a cyclic function subject to ring opening polymerization. An ethylenically unsaturated polymerizing group can be, for example, an acrylate or methacrylate, or vinyl group. A cyclic functional group subject to ring opening polymerization generally contains a heteroatom such as oxygen, sulfur or nitrogen, and preferably a 3-membered ring containing oxygen such as an epoxide. Additional surface reagents used to modify the polarity or hydrophobicity of the nanoparticle may be used as well. Examples of these reagents include, e.g., isooctyl trimethoxysilane, a product available under the trade designation BS-1316, from Wacker Silicones (Adrian, Mich.), and phenyl trimethoxysilane, n-octadecyltrimethoxy silane, 3-cyanopropyl trimethoxysilane, and 3-aminopropyl trimethoxysilane available from United Chemical Technologies.

Other preferred sources of unassociated metal oxide nanoparticles are sols having particles dissolveded in a solution. A zirconia sol, as disclosed in U.S. Pat. No. 5,037,579, incorporated by reference, provides suitable and preferable metal oxide nanoparticles for use with the invention. Another preferred zirconia sol is disclosed in U.S. Pat. application Ser. No. 09/428,374, entitled "Zirconia Sol and Method of Making Same", and which is incorporated herein by reference. Zirconia sols of Ser. No. 09/428,374 comprise a plurality of single crystal zirconia particles having an average primary particle size of about 20 nm or less, more preferably, having an average primary particle size ranging from about 7–20 nm.

Non-silica metal oxide nanoparticles may be surface treated through adsorption of acidic or basic compounds onto the surface. The surface treatment agents are preferably chosen to contain functional groups that provide solubility and/or reactivity of the surface modified heavy metal oxide particle with(in) the desired phase. Preferably, the metal oxide particles such as zirconia are treated with an acidic compound. Suitable surface-treatment acids include for example, carboxylic acids, phosphonic acids, and sulfonic acids. More preferably, the surface stabilization is performed with a mixture of acidic compounds where one or more has a polymerizable functionality. Most preferably, the acidic function is derived from oxyacids of boron, carbon, phosphorus, and sulfur. For example, it has been found that carboxylic acids adsorb particularly well to the surface of zirconia and ceria particles.

A mixture of acids is preferably used to surface treat (modify) heavy metal oxide particles. Preferably, the acids include the structure R—COOH, where R is an organic radical containing ethylenic unsaturation. R may be branched or straight chained and may be substituted (e.g., by a heteroatom). R typically contains from about 1 to 50 carbon atoms, preferably about 2 to 20 carbon atoms. A particularly preferred group of such acids includes R groups with terminal ethylenic unsaturation.

Hydrophilic, non-reactive acids suitable for the surface treatment (modification) of zirconia include 2-[2-(2-methoxy)ethoxy]ethoxy acetic acid (MEEAA), mono (polyethyleneglycol)succinate, mono(polyethyleneglycol)

maleate. Examples of hydrophilic and reactive acids suitable for the surface treatment include 2-hydroxymethyl-2-[(N-methacryloxyethyl) carbamoylmethyl] propionic acid (PAMA), mono(acryloxypolyethyleneglycol)succinate, and mono(acryloxypolyethyleneglycol)maleate. Other suitable reactive acids include 2,2-bis[(N-methacryloxyethyl) carbamoylmethyl] propionic acid (PDMA), acrylic acid, methacrylic acid, beta carboxyethylacrylate, mono-2-(methacryloxy)ethyl succinate, and mono-2-(methacryloxy) ethyl maleate. Combinations of such acids are also desirable to impart organic compatibility and reactivity. Other suitable acid mixtures useful for surface treatment of the non-silica metal oxide nanoparticles can include aliphatic carboxylic acids such as, for example, oleic acid, stearic acid, and octanoic acid, aromatic nonreactive acids such as methoxy phenyl acetic acid and 3,4,5 triethoxy benzoic acid, as well as itaconic acid, toluene sulfonic acid, ethylene glycol methacrylate phosphate, the salts of the acids just stated, and blends thereof.

Metal oxide nanoparticles which have been appropriately surface derivatized to provide solubility in either the reactive or immiscible phase of the current invention can then be combined with said phase by solvent exchange or by drying and dissolving the solid reagent in the phase. A particularly useful class of reagents for the current invention represent organosols in which derivatized colloidal silica is already dissolveded as in acrylate monomers. Materials of this type are available under the trade name of HIGHLINK® from Clariant Corporation (Basking Ridge, N.J.).

Polymerizable Material

The polymerizable material component comprises one or more monomers that may be photopolymerized or thermally polymerized. If the immiscible phase is water, the polymerizable material should be an ethylenically unsaturated substantially water-insoluble monomer. If the immiscible phase is nonaqueous, the polymerizable material may be a cationically-curable monomer, an ethylenicallyunsaturated monomer, or a water-soluble monomer. Suitable ethylenically unsaturated monomers include, for example, the ($C_1$–$C_{14}$) alkyl acrylates such as acrylic acid, butyl acrylate, n-butyl acrylate, hexyl acrylate, octyl acrylate, isooctyl acrylate, 2-ethylhexyl acrylate, isobornyl acrylate, nonyl acrylate, isononyl acrylate, decyl acrylate, dodecyl (lauryl) acrylate, isodecyl acrylate, tetradecyl acrylate; aryl and alkaryl acrylates such as benzyl acrylate and nonylphenyl acrylate, the ($C_4$–$C_{16}$) alkyl methacrylates such as methacrylic acid, hexyl methacrylate, octyl methacrylate, nonyl methacrylate, isononyl methacrylate, decyl methacrylate, isodecyl methacrylate, dodecyl (lauryl) methacrylate, tetradecyl methacrylate; acrylamides such as N-octadecyl acrylamide, and substituted acrylamides. Other ethylenically-unsaturated monomers that will copolymerize with acrylates may also be used. Suitable types of co-monomers include maleimides and azlactones. Styrenes are not preferred for the present invention due to their slow polymerization rate. Combinations of any of these monomers may also be used.

Other functionalized acrylate monomers can also be used including polyester acrylates, urethane acrylates, and acrylates of epoxidized oils. Monomers that incorporate subsequently reacting functiuonalized groups into the foam can also be included; these are further described in the Reactive Phase Additives section.

If the immiscible phase is non-aqueous, monomers that are difficult to polymerize in the presence of water, e.g., cationically-curable monomers and water-soluble or highly hydrophilic monomers, may be used in the reactive phase. Suitable cationically-curable monomers include those containing epoxide or vinyl ether functional groups. Suitable water-soluble or hydrophilic monomers include poly (ethylene glycol) acrylates of various molecular weights. The monomers listed above for aqueous emulsions may also be used with an emulsion having a non-aqueous immiscible phase.

Pressure Sensitive Adhesive (PSA) materials may also be used as a co-monomer. By proper selection of monomer(s), surfactant(s), initiator(s), and crosslinker(s), as known in the art, foams with PSA properties can be produced.

The reactive phase may also comprise multifunctional monomers and/or oligomers. These multifunctional materials may operate as both the polymerizable material and crosslinking agent because the crosslinking functionality can be introduced into the reactive phase via a crosslinking site on a monomer or a separate crosslinking species. In such a case no other ethylenically unsaturated monomer is necessary in the reactive phase.

The functionalized metal oxide nanoparticles can act as one of the polymerizable materials as they typically have many polymerizable groups attached to the surface.

The polymerizable material component may comprise between 50 and 99, preferably 80 to 95, weight percent of the reactive phase (assuming component densities of approximately 1 g/cc). The density of the functionalized metal oxide nanoparticles is typically much greater than 1 g/cc, which would affect the recommended weight percents described above.

Crosslinking Agents

Crosslinking agents are typically present to tie polymer chains together to create a more three-dimensional molecular structure. Selection of the particular type and amount of crosslinking agent will depend on the structural, mechanical, and fluid-handling properties desired in the resulting foam. Suitable crosslinking agents include monomers containing two or more ethylenicallyunsaturated groups such as polyfunctional acrylates, methacrylates, acrylamides, methacrylamides, and mixtures thereof. These include di-, tri-, and tetra-acrylates; as well as di-, tri-, and tetra-acrylamides; di-, tri-, and tetra-methacrylates; di-, tri-, and tetra-methacrylamides, and mixtures of these monomers. Specific examples include diethylene glycol diacrylate, trimethylol propane triacrylate, ethoxylated trimethylolpropane triacrylate, urethane acrylates, epoxy acrylates, polyester acrylates, oligomeric diacrylates.

Suitable acrylate and methacrylate crosslinking agents can be derived from diols, triols, and tetraols, that include 1,10-decanediol, 1,8-octanediol, 1,6-hexanediol; 1,4-butanediol; 1,3-butanediol; 1,4-but-2-enediol; ethylene glycol; diethylene glycol; trimethylolpropane; pentaerythritol; hydroquinone; catechol; resorcinol; triethylene glycol; polyethylene glycol; sorbitol; divinyl ethers and diepoxides; and the like. If the emulsion has a nonaqueous immiscible phase, crosslinking agents sensitive to water such as diepoxides and divinyl ethers can be used in the reactive phase. Emulsions having non-aqueous immiscible phases can also use the crosslinking agents used in aqueous emulsions.

The functionalized metal oxide nanoparticles can function as the crosslinking agent since they typically have many polymerizable groups attached to the surface of each nanoparticle.

Crosslinking agents may comprise from 1 to 99 weight %, preferably 2 to 75 weight %, of the reactive phase (assuming reactive phase component densities are approximately 1 g/cc).

Emulsifiers

Emulsifiers may also be a component of the reactive phase of emulsions in the present invention. The emulsifier may be the same material as the polymerizable material. Suitable emulsifiers include reactive surfactants and non-reactive surfactants. Reactive surfactants, having ethylenically-unsaturated bonds, or cationically curable bonds, can participate in the polymerization and crosslinking of the polymerizing materials in the reactive phase and thereby become part of the foam structure. Reactive surfactants are typically preferred over non-reactive surfactants because they have a reduced tendency to leach out of the resulting foam article during use. This can be particularly beneficial in applications where the foam comes into contact with skin.

In a water-in-oil emulsion, the emulsifier preferably has a hydrophilic to lipophilic balance (HLB) of 3 to 14, usually 4 to 6, depending on the monomer(s) used.

Suitable classes of non-ionic emulsifiers for water-in-oil emulsions include polyoxyethylenated alkylphenols, polyoxyethylenated straight-chain alcohols, polyoxyethylenated polyoxypropylene glycols, polyoxyethylenated mercaptans, long-chain carboxylic acid esters, alkanolamine condensates, tertiary acetylenic glycols, polyoxyethylenated silicones, N-alkylpyrrolidones, fluorocarbon liquids, and alkylpolyglycosides. Specific emulsifiers most suited to water-in-oil emulsions include sorbitan monoleate, glycerol monoleate, polyethylene glycol (200 molecular weight) dioleate, Castor oil, glycerol monoricinoleate, distearyl dimethylammonium chloride, dioleyl dimethylammonium chloride, and bis-tridecyl sulphosuccinic acid (sodium salt). Cationic and anionic surfactants can also be used as emulsifiers in this invention. When the immiscible phase is non-aqueous, other classes of emulsifiers, such as fluorocarbon liquids, are available in addition to those listed above. In cases of cationic polymerization, it is preferable to use a non-ionic surfactant to avoid interfering with the polymerization reaction. Mixtures of emulsifiers may also be used.

Suitable reactive surfactants for the water-in-oil emulsions include methoxypoly(ethyleneoxy) ethyl acrylate having 1 to 40 oxyethylene groups, alkylene polyalkoxy sulfate (MAZON SAM 211-80, BASF, Mount Olive, N.J.), and copolymerizable alkoxy surfactant (MAZON SAM-185, BASF, Mount Olive, N.J.). The emulsifiers listed at col. 20, lines 55 et seq, and col. 21–22 of U.S. Pat. No. 5,856,366 may also be used in the present invention.

These same emulsifiers and surfactants, as well as others, can be used when the immiscible phase is nonaqueous.

The type of surfactant used can affect the microstructure of the resulting foam. The applicants found that, depending on the reactive surfactant used, increased emulsion agitation resulted in different cell sizes and/or number of cell windows.

The functionalized metal oxide nanoparticles can have surfactant-like properties, and some foams have been made without using an additional surfactant or emulsifier when the functionalized metal oxide nanoparticles are included in the reactive phase.

Emulsifiers typically comprise up to 30 weight percent of the reactive phase (assuming all the reactive phase components have a density of approximately 1 g/cc).

Initiators

Photoinitiators can rapidly and efficiently respond to a light source with the production of radicals, cations, and other species that are capable of initiating a polymerization reaction. Preferably the photoinitiators used in the present invention absorb at wavelengths of 200 to 800 nanometers, more preferably 300 to 800 nanometers, most preferably 300 to 450 nanometers. The photoinitiator provides a convenient trigger for the polymerization reaction. If the photoinitiator is in the reactive phase, suitable types of oil-soluble photoinitiators include benzil ketals, α hydroxyalkyl phenones, α amino alkyl phenones, and acylphospine oxides. Specific initiators include 2,4,6-[trimethylbenzoyldiphosphine] oxide in combination with 2-hydroxy-2-methyl-1-phenylpropan-1-one (50:50 blend of the two is sold by Ciba Geigy as DAROCUR 4265); benzil dimethyl ketal (sold by Ciba Geigy as IRGACURE 651); α,αdimethoxy-α-hydroxy acetophenone (sold by Ciba Geigy as DAROCUR 1173); 2-methyl-1-[4-(methyl thio) phenyl]-2-morpholino-propan-1-one (sold by Ciba Geigy as IRGACURE 907); Oligo [2-hydroxy-2-methyl-1-[4-(1-methylvinyl) phenyl] propanone] (sold as ESACURE KIP EM by Lamberti s p a); Bis(2,4,6-trimethylbenzoyl)-phenylphosphineoxide (sold by Ciba Geigy as IRGACURE 819). Other suitable initiators are those disclosed in U.S. Pat. No. 5,545,676, PCT/US98/04458, and PCT/US98/04029, all of which are incorporated by reference.

Photoinitiators may comprise between 0.05 and 10.0, preferably between 0.2 and 10, weight percent of the reactive phase. Lower amounts of photoinitiator allow light to better penetrate the emulsion, which can provide for polymerization deeper in the foam layer. However, if polymerization is done in an oxygen-containing environment, there must be enough initiator to initiate the polymerization and overcome oxygen inhibition. Further, light scattering by the emulsion, which also affects light penetration depth, is not affected by photoinitiator concentration.

Thermal initiators can be used instead of, or in addition to, photoinitiators in the emulsion systems of the present invention. Useful thermal initiators include, e.g., azo compounds, peroxides, dialkyl and diacyl peroxides, hydroperoxides, peroxy dicarbonates, peroxy ketals, peroxy esters, peroxycarboxylates, potassium persulfate, t-butyl peroxyisobutyrate, and 2,2'-azobisisobutyronitrile, 2,2'-azobis(2,4-dimethylpentane nitrile), and other redox-type initiators. The thermal initiator could be present in either the reactive or immiscible phase, and can be included independently of the photoinitiator (in systems meant for thermal polymerization only).

Reactive Phase Additives

The reactive phase may contain inert ingredients, such as polymers that are dissolved, but do not undergo polymerization. These ingredients may add strength or toughness or other desirable properties to the polymerized foam. Suitable polymer additives include polyisoprene, polyethylene, polypropylene, polybutadiene, and acrylic tougheners. Other suitable reactive phase additives include flame retardants, fillers, $CaCO_3$, carbon black, pigments, minerals and dyes.

The reactive phase may also comprise materials that can incorporate subsequently reactive functional groups into the foams during their fabrication. Many functional groups can be incorporated with vinyl-containing monomers (e.g., vinyl dimethyl azlactone) or acrylate esters or other acrylate and methacrylate groups (e.g., hydroxyethyl acrylate, acrylamide, butylmethacrylates). Reactive functional groups that may be incorporated include carboxylates, amines (including primary, secondary, tertiary, and quarternary amines and polyamines), sulfhydryls, azlactones, aldehydes, epoxides, maleimide isothiocyanates, isocyanates, n-alkyl groups (e.g., butyl, octyl, and octadecyl groups), phenyl and benzyl groups, cycloalkyl groups, hydroxy and hydroxyethyl groups, amides including (acrylamides), sulfonates, sulfonamides, phosphates, polyphosphates, iminodiacetates, various bypryridyl groups, salicylates, polyethers (including crown and cryptand ethers), and cyclodextrans.

Optionally, the reactive phase can also contain a miscible fluid that is not reactive, (for example, a solvent). The addition of a non-polymerizable fluid to the reactive phase can enable processing of solid monomers. For example, monomers can be dissolved and allowed to polymerize as liquids dissolved in a reactive phase. This strategy can also help to reduce the density of the resulting foams.

When the reactive phase contains additives, the polymerizable material(s) may comprise less than 50 wt. % of the reactive phase. This estimate of composition is valid when the reactive phase components have an approximate density of 1 g/cc.

Immiscible Phase

The immiscible phase may comprise any suitable fluid that is substantially immiscible with the polymerizable material(s) in the reactive phase and is a liquid at operating conditions. The most familiar immiscible phase is water. The immiscible phase may comprise an initiator or emulsifier. The immiscible phase may also comprise functionalized silica nanoparticle materials. In this case, the reactive phase may or may not also contain functionalized silica nanoparticle materials.

The immiscible phase fluid should have a viscosity of at least 1 centipoise at the use temperature. The upper viscosity limit for the immiscible phase will depend on the viscosity of the reactive phase and the desired foam structure. The immiscible fluid should not absorb light in the same wavelength as the photoinitiator, if one is being used. Suitable fluids other than water include, for example, fluorocarbon liquids and organic liquids in which the reactive phase is immiscible. Using a non-aqueous discontinuous or co-continuous phase can allow different types of reaction chemistries for polymerizing the foams. For example, cationic polymerization or free radical polymerization of water soluble and very hydrophilic materials.

Initiators

Photoinitiators soluble in the immiscible phase may be used in the present invention. Suitable photoinitiators include those disclosed in U.S. Pat. No. 5,545,676, incorporated by reference. The photoinitiator used should absorb light at the wavelength(s) used to polymerize the emulsion, and should be effective for the type of polymerization used, e.g., free radical or cationic. Preferably the photoinitiators used in the present invention absorb at wavelengths of 200 to 800 nanometers. Initiators of the classes described in the reactive phase section can also be used in the immiscible phase of the emulsion.

Thermal initiators soluble in the immiscible phase may be used in the present invention. Suitable thermal initiators include the same classes of materials described in the reactive phase initiator section.

Salts

Salts in the immiscible phase can increase the stability of the emulsion by minimizing the tendency of monomers, comonomers, and crosslinkers that are primarily soluble in the reactive phase to partition into the immiscible phase. Suitable salts for an aqueous immiscible phase include mono-, di-, or tri-valent inorganic salts including water-soluble halides, e.g., chlorides, nitrates, and sulfates of alkali metals and alkaline earth metals such as sodium chloride, calcium chloride, sodium sulfate, and magnesium sulfate and other salts described in U.S. Pat. No. 5,352,711, incorporated by reference. Hydratable inorganic salts may also be incorporated into the foams to increase hydrophilicity. Aqueous salt solutions may be used to treat the foams after removal of, or as part of the process of removing, a residual aqueous immiscible phase from a just-polymerized foam.

When the immiscible phase is non-aqueous, salts having organic cations or anions may be used. Suitable salts include, for example, borates, trifluoromethane sulfonates (triflates), and hexafluorophosphates.

If present in a photopolymerizable emulsion of the present invention, the salts preferably comprise less than 0.2 wt %, more preferably less than 0.1 wt % of the immiscible phase. However, the salts can be present at concentrations up to and including 10 weight percent.

The use of salts in the immiscible phase is common in thermally-polymerized foams due to the increased time elapsed between emulsion formation and polymerization. In the case of thermal-polymerization, the salt content is typically 1 wt % to 10 wt % of the immiscible phase, although the inclusion of salt is not necessary in the present invention. The presence of salt in the immiscible phase has been shown to affect the cell size distribution, especially in thermally-polymerized samples.

Immiscible Phase Additives

The immiscible phase may contain additives such as ion exchange beads, fibers, and particulates. If the immiscible phase is removed after polymerization, these additives may remain in the foam by coating onto the interior surfaces of the foam cells or structure through physical entrainment or through deposition during immiscible phase removal. For example, evaporation can leave salts behind. Soluble species, such as polymers, might also be added to the immiscible phase to provide enhanced properties or mechanical strength to the emulsion or the polymerized foams.

Emulsion Additives

The emulsion may also include additives that are not soluble in either the reactive or immiscible phase. Examples of suitable additives include ion exchange beads, fibers, particles, other foams, as described in U.S. Pat. No. 5,037,859, incorporated by reference, pigments, dyes, carbon black, reinforcing agents, solid fillers, hydrophobic or hydrophilic silica, calcium carbonate, toughening agents, flame retardants, antioxidants, finely ground polymeric particles (e.g., polyester, nylon, polypropylene, or polyethylene), expandable microspheres, glass beads, stabilizers (e.g., UV stabilizers), mineral particles, and combinations thereof.

The additives may be added in amounts sufficient to obtain the desired properties for the foam being produced. The desired properties are largely dictated by the intended application of the foam or foam article. The additives should be selected such that interference with the desired type of polymerization is minimized.

This invention may be illustrated by way of the following examples.

EXAMPLES

Test Methods

Scanning Electron Microscope

The SEM micrographs were taken with either a JEOL 35C or a JEOL Model 840 SEM (Peabody, Mass.). Foam samples that did not exhibit any collapse upon drying (removal of the immiscible phase) were freeze fractured under liquid nitrogen, sputter coated with either gold or a gold palladium (60/40) mixture, and the cross-sections were imaged. Foams that collapsed partially or completely upon drying were imaged in the swollen state by performing a crude freeze-drying procedure. The freeze dried samples were prepared by swelling them completely in water (15–30 minutes), then immersing them in a pool of liquid nitrogen to freeze them in the swollen state. The pool of liquid nitrogen (containing the frozen sample) was placed into a vacuum evaporator (Denton Vacuum Model DV-502A, Moorestown, N.J.) and the sample was left under vacuum for approximately 16 hours. When the sample was removed from the evaporator, it was dry but was not in the collapsed state. The dry sample cross section was then sputter coated and imaged as described above.

Examples 1–4

Approximately 86 g of 20 nm olefinic nanosilica (functionalized silica nanoparticles) was prepared by diluting 100 grams (gm) of a 40 wt % solution of ammonium stabilized 20 nm colloidal silica (Nalco 2327, Naperville, Ill.) in water with an equal weight of reagent denatured ethanol (EM Science, Gibbstown, N.J.) in a stirred reactor. The sample was charged with 3.0 gm of methacryloxypropyltrimethoxy silane (OSi Silquest A-174, Witco, Friendly, W.V.) and with 8.4 gm of isooctyl trimethoxy silane (BS-1316, Wacker Silicones, Adrian, Mich.), and the solution was stirred while it was reacted at 75° C. for 16 hours. The temperature was decreased to 60° C. and a 4.0 gm charge of hexamethyldisilazane (Aldrich Chemical) was added and was reacted for an additional 24 hours. The derivatized $SiO_2$ product was filtered and was dried at 125° C. to yield dry functionalized nanosilica. A 50.0 gm sample of this dried olefinic nanosilica was treated with an equal weight of isooctyl acrylate (Aldrich Chemical) and the sample was stirred and sonicated (i.e. treated in an ultrasonic bath) until the solids dissolveded to yield a clear solution.

A 0.09 gm sample of Irgacure® 907 photoinitiator (Ciba Geigy) was dissolved in 20.06 gm sample of this 50/50 olefinic nanosilica/IOA solution. 15.33 gm of deionized water was added to the sample which was then mixed vigorously using a high speed mixer to yield a white emulsion of low viscosity. Using a specific gravity of 2.1 for the nanosilica, the volumetric composition of this emulsion is detailed as sample 1 in Table 1. After a portion of the emulsion was polymerized as Sample 1, one drop of concentrated ammonium hydroxide (15M, VWR Scientific, San Francisco, Calif.) was added to the remaining liquid emulsion. A sample of this was polymerized and called sample 1B (composition not shown). Portions of the sample 1B emulsion were then diluted further with additional water to provide emulsion compositions 2–4 as detailed in Table 1.

Figure 1B:
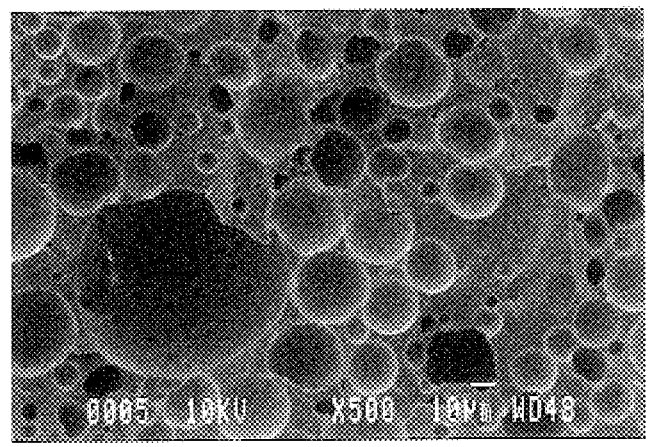
Figure 1C:
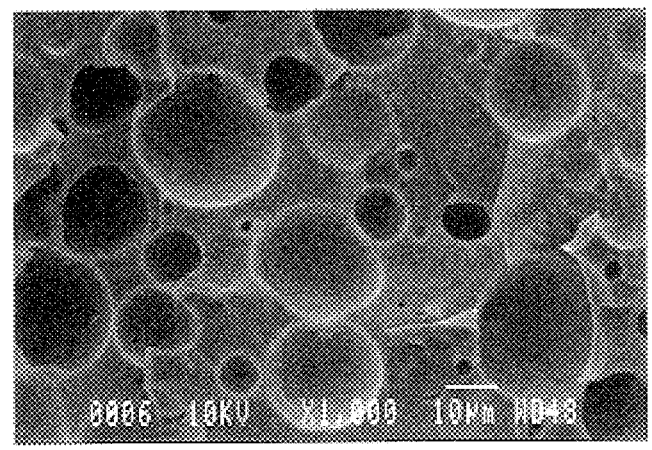
Figure 2A:
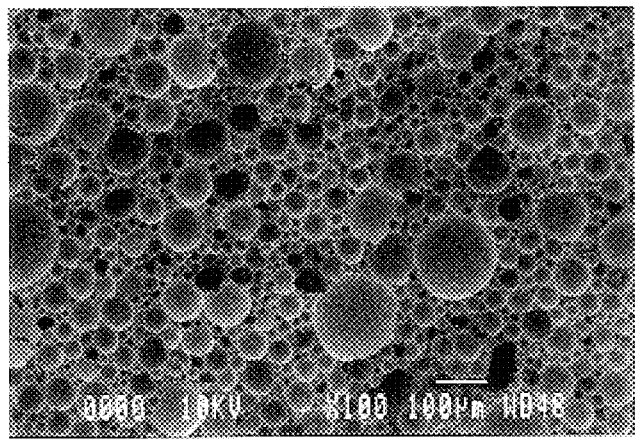
FIGS. 2a–2c show SEM digital image micrographs of cross sections of a photopolymerized isooctyl acrylate foam containing functionalized silica nanoparticles. The composition of the emulsion used to prepare this foam is disclosed as sample 4 in Table 1. Magnification of the foam increases from top to bottom with the magnifications being 1000×, 500×, and 1000×, respectively.
Figure 2B:
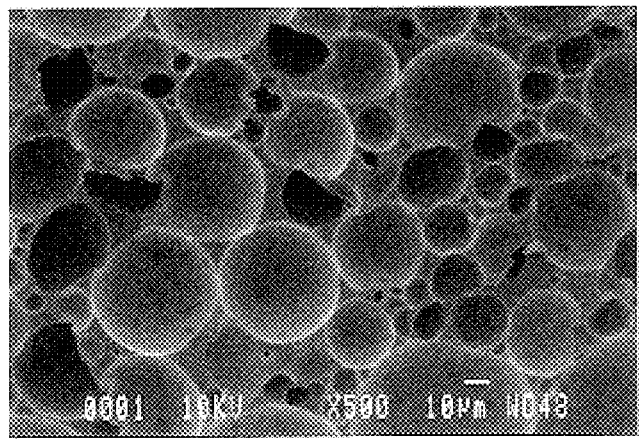
Figure 2C:
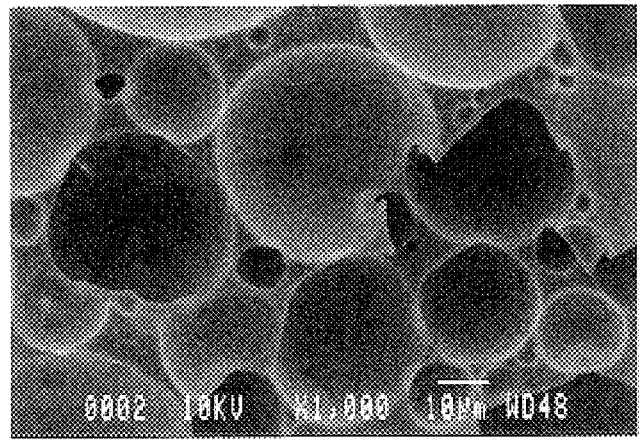

Portions of these emulsion samples 1–4 were then poured onto polyester film in a 2–3 mm deep mold, and were exposed to UV irradiation for 10 min to yield porous white membranes. The UV light cure chamber consisted of six low intensity bulbs emitting light predominately of wavelength 313 nm oriented approximately 5 inches above the sample, and 6 low intensity bulbs emitting light predominately of wavelength 350 nm oriented approximately 14 inches below the sample. There were two sheets of polymethyl methacrylate approximately ¼ inch in thickness between the 350-nm bulbs and the sample. SEM micrographs were taken of the cross-sections of samples 1B and 4, these are included as FIGS. 1 and 2.

TABLE 1

Volumetric composition of aqueous IOA/nanosilica emulsion samples.

|  | 1 | 2 | 3 | 4 |
|---|---|---|---|---|
| Nanosilica | 15% | 11% | 8.2% | 7.3% |
| IOA | 36% | 26% | 20% | 17% |
| Water | 49% | 63% | 72% | 75% |
| Irg. 907 | 0.3% | 0.2% | 0.2% | 0.1% |

Example 5

An 11.64 gm sample of a 50/50 w/w solution of olefinic nanosilica/IOA as prepared in Examples 1–4, was used to dissolve 50 mg of KB-1 photoinitiator (Fratelli Lamberti, Italy). A 24.5 gm portion of deionized water and a 0.15 gm charge of a solution of concentrated (15M) aqueous ammonium hydroxide (VWR Scientific, San Francisco, Calif.) were added to the above-described mixture, and the entire sample was mixed using a high speed mixer to yield a white emulsion of low viscosity. Using a specific gravity of 2.1 for the nanosilica, the weight and volumetric composition of this emulsion are summarized in Table 2.

Figure 3A:
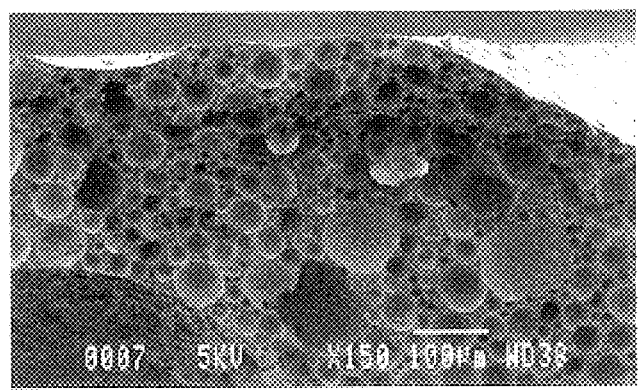
FIGS. 3a–3c show SEM digital image micrographs of cross sections of a sheet of a porous photopolymerized isooctyl acrylate foam containing functionalized silica nanoparticles. The composition of the emulsion used to prepare this foam is disclosed in Table 2 of Example 5. Magnification of the foam is 150× for 3a and 3b and 35× for 3c.
Figure 3B:
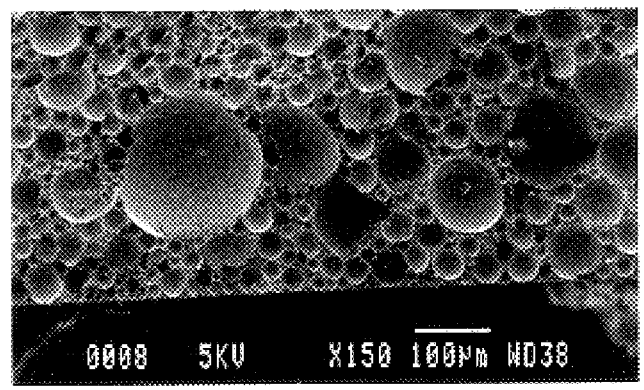
Figure 3C:
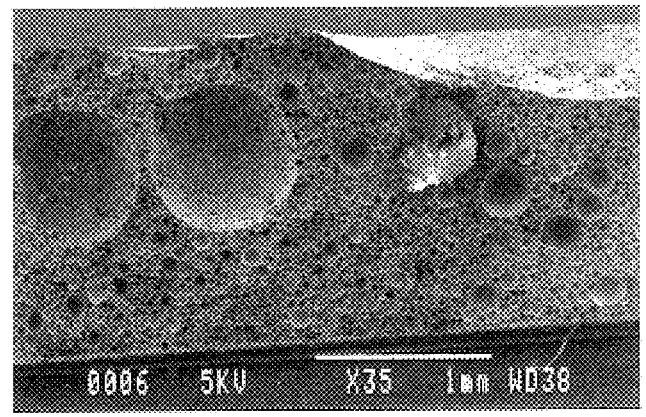

A portion of this emulsified sample was then coated on a glass plate using a 3 mm spacer, and was photocured under UV irradiation for 10 min to yield a porous white membrane. The UV light chamber was the same as that described in Examples 1–4. This sample was then dried under vacuum to remove water. SEM micrographs taken of the dry sample cross-section are shown in FIG. 3.

TABLE 2

Approximate weight and volume composition of emulsion product in Example 5.

|  | KB-1 | IOA | Nanosilica | Water | $NH_4OH$ |
|---|---|---|---|---|---|
| Wt % | 0.1% | 16.0% | 16.0% | 67.4% | 0.4% |
| Vol % | 0.1% | 19.4% | 8.1% | 71.9% | 0.4% |

Example 6

Figure 4A:
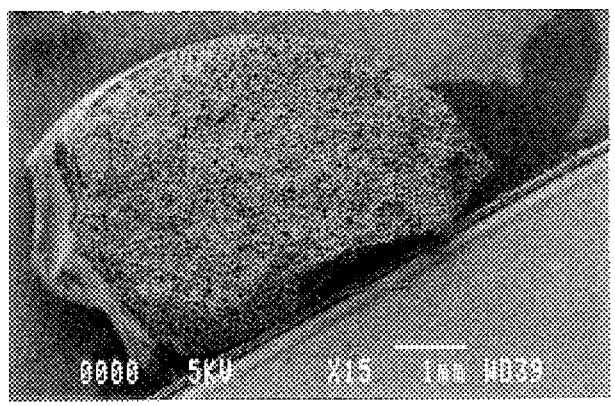
FIGS. 4a–4c show SEM digital image micrographs of cross sections of a rod-shaped porous thermally polymerized isooctyl acrylate foam containing functionalized silica nanoparticles. The composition of the emulsion used to prepare this foam is disclosed in Table 3 of Example 6. Magnification of the foam increases from top to bottom, with the magnifications being 15×, 50× and 150×, respectively.
Figure 4B:
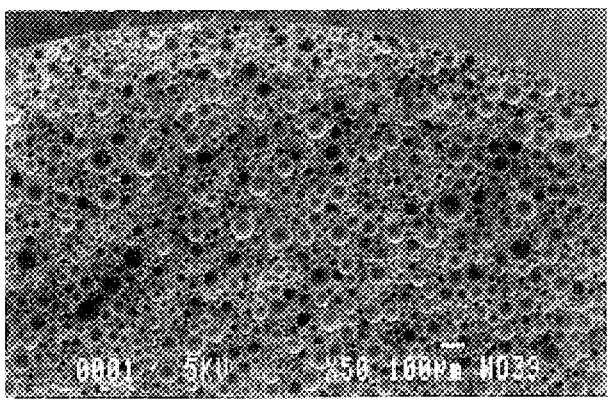
Figure 4C:
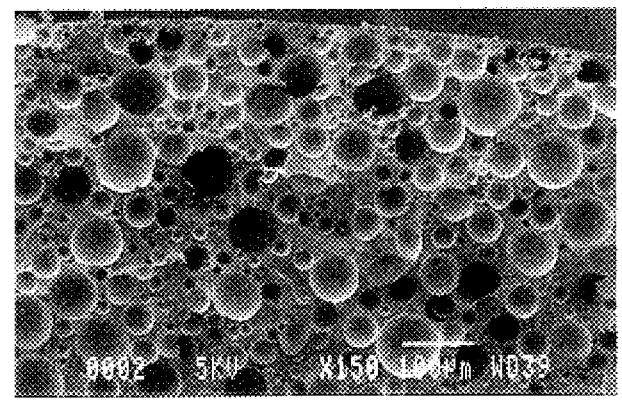

A 10.00 gm sample of a 50/50 w/w solution of olefinic nanosilica/IOA as prepared in Examples 1–4, was treated with an additional 2.50 gm of the dry olefinic nanosilica prepared as in Examples 1–4. This solution was sonicated and mixed to completely dissolve the additional solids so as to yield a clear solution product with a 60/40 w/w composition of olefinic nanosilica/IOA resin. This sample was used to dissolve 78.5 mg of 2,2' azobisisobutyronitrile initiator (AIBN) (Aldrich, Milwaukee, Wis.). 8.80 grams of deionized water was added to the nanosilica/reactive monomer mixture and the entire sample was shaken vigorously for 3 min, forming a white emulsion. Using a specific gravity of 2.1 for the functionalized nanosilica, the weight and volumetric composition of this emulsion are summarized in Table 3. Portions of this emulsion were transferred to fill various molds, including a 100 mm long×8 mm inside diameter stainless steel cylinder. The samples were then thermally cured at 75° C. for 90 min. A porous cylindrical rod product was obtained from the cylinder mold. This sample was then dried under vacuum to remove $H_2O$. SEM micrographs of the cross-section of this sample are shown in FIG. 4.

TABLE 3

Approximate weight and volume composition of emulsion product in Example 6

|  | AIBN | IOA | Nanosilica | Water |
| --- | --- | --- | --- | --- |
| Wt % | 0.4% | 23.4% | 35.1% | 41.2% |
| Vol % | 0.4% | 31.3% | 19.7% | 48.5% |

Other embodiments of the invention are within the scope of the following claims.

What is claimed is:

1. A process for making a crosslinked polymeric foam comprising:
    a) mixing a reactive phase comprising at least one polymerizable material and at least one functionalized metal oxide nanoparticle material with at least one initiator and a fluid immiscible with the reactive phase to form an emulsion wherein the immiscible fluid forms a discontinuous or co-continuous phase with the continuous reactive phase;
    b) shaping the emulsion; and
    c) exposing the emulsion to radiation suitable to activate the included initiator to form a crosslinked polymeric foam.

2. The process of claim 1 wherein the reactive phase further contains a crosslinking agent.

3. The process of claim 1 wherein the reactive phase further contains an emulsifier.

4. The process of claim 1 wherein the polymerizable material comprises an ethylenically-unsaturated monomer.

5. The process of claim 1 wherein the polymerizable material acts as a crosslinking agent.

6. The process of claim 1 wherein at least one polymerizable material also acts as an emulsifier.

7. The process of claim 1 wherein at least one functionalized metal oxide nanoparticle material also acts as an emulsifier.

8. The process of claim 1 wherein the immiscible fluid is water.

9. The process of claim 1 wherein the immiscible fluid comprises at least 74 volume percent of the emulsion.

10. The process of claim 1 wherein the emulsion is applied onto or into materials before polymerization and crosslinking.

11. The process of claim 1 wherein at least one functionalized metal oxide nanoparticle material is in the reactive phase.

12. The process of claim 1 wherein the reactive phase further comprises materials that can incorporate post reactive functional groups into the foam.

13. The process of claim 1 wherein the emulsion is one or both of polymerized and crosslinked using at least ultraviolet or visible radiation of 200 to 800 nanometers.

14. The process of claim 1 wherein the emulsion is one or both of polymerized and crosslinked using at least thermal energy.

15. A process for making a crosslinked polymeric foam comprising:
    a) mixing reactive phase comprising at least one polymerizable material with at least one initiator and a fluid immiscible with the reactive phase, said immiscible fluid comprising at least one functionalized metal oxide nanoparticle material, to form an emulsion wherein the immiscible fluid forms a discontinuous or co-continuous phase with the continuous reactive phase;
    b) shaping the emulsion; and
    c) exposing the emulsion to radiation suitable to activate the included initiator to form a crosslinked polymeric foam.

* * * * *

UNITED STATES PATENT AND TRADEMARK OFFICE
CERTIFICATE OF CORRECTION

PATENT NO. : 6,353,037 B1 Page 1 of 1
DATED : March 5, 2002
INVENTOR(S) : Thunhorst, Kristin L.

It is certified that error appears in the above-identified patent and that said Letters Patent is hereby corrected as shown below:

Column 4,
Line 55, please delete "1000X" and insert in place thereof -- 100X --.

Column 13,
Line 27, please delete the word "dissolveded" and insert in place thereof -- dissolved --.
Line 37, please delete the word "ethylenicallyunsaturated" and insert in place thereof
-- ethylenically-unsaturated --.
Line 61, please delete the word "functiuonalized" and insert in place thereof
-- functionalized --.

Column 14,
Line 37, please delete the word "ethylenicallyunsaturated" and insert in place thereof
-- ethylenically-unsaturated --.

Column 19,
Line 36, please delete the word "dissolveded" and insert in place thereof -- dissolved --.

Signed and Sealed this

Twenty-second Day of July, 2003

JAMES E. ROGAN
*Director of the United States Patent and Trademark Office*